(12) United States Patent
Johnson et al.

(10) Patent No.: US 9,525,285 B2
(45) Date of Patent: Dec. 20, 2016

(54) ENERGY SYSTEMS AND ENERGY SUPPLY METHODS

(75) Inventors: Shane Johnson, Rosalia, WA (US);
Allan Coxon, Ford, WA (US); Ian Walker, Spokane, WA (US)

(73) Assignee: Demand Energy Networks, Inc., Liberty Lake, WA (US)

( * ) Notice: Subject to any disclaimer, the term of this patent is extended or adjusted under 35 U.S.C. 154(b) by 977 days.

(21) Appl. No.: 13/495,935

(22) Filed: Jun. 13, 2012

(65) Prior Publication Data
US 2013/0147272 A1  Jun. 13, 2013

Related U.S. Application Data

(60) Provisional application No. 61/496,400, filed on Jun. 13, 2011.

(51) Int. Cl.
| | | |
|---|---|---|
| *H02J 4/00* | (2006.01) | |
| *H02J 3/36* | (2006.01) | |
| *H02J 3/38* | (2006.01) | |

(52) U.S. Cl.
CPC .. *H02J 4/00* (2013.01); *H02J 3/36* (2013.01); *H02J 3/383* (2013.01); *H02J 3/386* (2013.01);
(Continued)

(58) Field of Classification Search
CPC .............. H02J 3/36; H02J 3/383; H02J 3/386; H02J 4/00; Y02E 10/563; Y02E 10/763; Y02E 60/60
(Continued)

(56) References Cited

U.S. PATENT DOCUMENTS

| | | |
|---|---|---|
| 1,279,392 A | 9/1918 | Martinetto |
| 2,194,822 A | 3/1940 | Dannheiser |
| | (Continued) | |

FOREIGN PATENT DOCUMENTS

| | | |
|---|---|---|
| CN | 1242883 | 1/2000 |
| CN | 200980125088.7 | 12/2012 |
| | (Continued) | |

OTHER PUBLICATIONS

CN 200980125088.7 Search Rept., Dec. 12, 2012, Demand Energy Networks, Inc.
(Continued)

*Primary Examiner* — Jared Fureman
*Assistant Examiner* — Emmanuel R Dominique
(74) *Attorney, Agent, or Firm* — Wells St. John P.S.

(57) ABSTRACT

Energy systems and energy supply methods are described. In one aspect, an energy system includes a bus system configured to conduct electrical energy, a plurality of input adapters electrically coupled with the bus system and configured to electrically couple with a plurality of respective source entities which are individually configured to provide electrical energy, a plurality of output adapters electrically coupled with the bus system and configured to electrically couple with a plurality of respective consuming entities which are individually configured to consume electrical energy, and control circuitry configured to control individual ones of the input adapters to provide electrical energy from respective ones of the source entities to the bus system and to control individual ones of the output adapters to provide electrical energy from the bus system to respective ones of the consuming entities.

17 Claims, 4 Drawing Sheets

(52) U.S. Cl.
CPC ............. *Y02E 10/563* (2013.01); *Y02E 10/763* (2013.01); *Y02E 60/60* (2013.01); *Y10T 307/391* (2015.04)

(58) Field of Classification Search
USPC ........................................................ 307/29
See application file for complete search history.

(56) References Cited

U.S. PATENT DOCUMENTS

| | | | |
|---|---|---|---|
| 3,050,635 A | 8/1962 | Tanner | |
| 3,571,693 A | 3/1971 | Riaz | |
| 4,131,827 A | 12/1978 | Larrabee | |
| 4,203,041 A | 5/1980 | Sachs | |
| 4,356,440 A * | 10/1982 | Curtiss | H02J 3/1835 322/20 |
| 4,465,943 A | 8/1984 | Risberg | |
| 4,473,792 A | 9/1984 | Nola | |
| 5,028,804 A | 7/1991 | Lauw | |
| 5,327,066 A | 7/1994 | Smith | |
| 5,422,624 A | 6/1995 | Smith | |
| 5,476,293 A | 12/1995 | Yang | |
| 5,499,181 A | 3/1996 | Smith | |
| 5,576,613 A | 11/1996 | Yang | |
| 5,642,270 A | 6/1997 | Green et al. | |
| 5,689,174 A | 11/1997 | Pacheco, Sr. | |
| 5,717,374 A | 2/1998 | Smith | |
| 5,742,229 A | 4/1998 | Smith | |
| 5,767,584 A | 6/1998 | Gore et al. | |
| 5,784,238 A * | 7/1998 | Nering | H02J 1/10 361/62 |
| 5,798,632 A | 8/1998 | Muljadi | |
| 5,803,215 A | 9/1998 | Henze | |
| 5,804,948 A | 9/1998 | Foust | |
| 5,806,018 A | 9/1998 | Smith et al. | |
| 5,880,537 A | 3/1999 | Windhorn | |
| 5,914,654 A | 6/1999 | Smith | |
| 5,931,021 A | 8/1999 | Shnaid et al. | |
| 6,018,293 A | 1/2000 | Smith | |
| 6,067,008 A | 5/2000 | Smith | |
| 6,107,691 A | 8/2000 | Gore et al. | |
| 6,185,501 B1 | 2/2001 | Smith et al. | |
| 6,323,625 B1 | 11/2001 | Bhargava | |
| 6,522,031 B2 | 2/2003 | Provanzana et al. | |
| 6,605,928 B2 | 8/2003 | Gupta et al. | |
| 6,697,951 B1 | 2/2004 | Sinha et al. | |
| 6,727,809 B1 | 4/2004 | Smith | |
| 6,779,771 B2 | 8/2004 | Ostrovsky et al. | |
| 6,788,031 B2 | 9/2004 | Pendell | |
| 6,812,586 B2 | 11/2004 | Wacknov et al. | |
| 6,891,282 B2 | 5/2005 | Gupta et al. | |
| 6,909,199 B2 | 6/2005 | Gupta et al. | |
| 6,998,728 B2 | 2/2006 | Gupta et al. | |
| 7,038,329 B1 | 5/2006 | Fredette et al. | |
| 7,064,513 B2 | 6/2006 | Fenley | |
| 7,161,253 B2 | 1/2007 | Sodemann et al. | |
| 7,200,994 B2 | 4/2007 | Chertok | |
| 7,212,916 B2 | 5/2007 | Alewine et al. | |
| 7,248,490 B2 | 7/2007 | Olsen et al. | |
| 7,262,694 B2 | 8/2007 | Olsen et al. | |
| 7,274,975 B2 | 9/2007 | Miller | |
| 7,385,373 B2 | 6/2008 | Doruk et al. | |
| 7,388,299 B2 | 6/2008 | Blackman | |
| 7,566,991 B2 | 7/2009 | Blackman | |
| 7,579,702 B2 | 8/2009 | Park et al. | |
| 7,609,019 B2 | 10/2009 | Beck et al. | |
| 7,737,571 B2 | 6/2010 | Fein et al. | |
| 7,888,916 B1 | 2/2011 | Taylor | |
| 7,999,405 B2 | 8/2011 | Peterson | |
| 8,008,808 B2 * | 8/2011 | Seeker | H02J 1/102 307/72 |
| 8,097,967 B2 | 1/2012 | Hamilton | |
| 8,319,358 B2 | 11/2012 | Curry et al. | |
| 8,364,287 B2 * | 1/2013 | Pearson | H01M 8/04619 320/101 |
| 8,482,155 B2 * | 7/2013 | Choi | H02J 3/32 307/71 |
| 8,508,058 B2 | 8/2013 | Hamilton | |
| 8,866,334 B2 * | 10/2014 | Donnelly | H02J 1/10 290/2 |
| 2002/0070716 A1 | 6/2002 | Gupta et al. | |
| 2002/0175522 A1 | 11/2002 | Wacknov et al. | |
| 2003/0230690 A1 | 12/2003 | Ostrovsky et al. | |
| 2004/0066177 A1 | 4/2004 | Gupta et al. | |
| 2004/0090211 A1 | 5/2004 | Gupta et al. | |
| 2004/0201218 A1 | 10/2004 | Hebert | |
| 2004/0262996 A1 | 12/2004 | Olsen et al. | |
| 2004/0263116 A1 | 12/2004 | Doruk et al. | |
| 2005/0153173 A1 | 7/2005 | Kumashiro et al. | |
| 2005/0185429 A1 | 8/2005 | Vinciarelli | |
| 2005/0200133 A1 * | 9/2005 | Wobben | 290/55 |
| 2006/0032045 A1 | 2/2006 | Naarmann et al. | |
| 2006/0082222 A1 * | 4/2006 | Pincu | H02J 1/102 307/29 |
| 2006/0091674 A1 | 5/2006 | Fredette et al. | |
| 2006/0129283 A1 | 6/2006 | Alewine et al. | |
| 2006/0237970 A1 | 10/2006 | Bailey, Sr. | |
| 2007/0005192 A1 | 1/2007 | Schoettle et al. | |
| 2007/0005195 A1 | 1/2007 | Pasquale et al. | |
| 2007/0063677 A1 | 3/2007 | Schauder | |
| 2007/0182383 A1 | 8/2007 | Park et al. | |
| 2007/0203860 A1 | 8/2007 | Golden et al. | |
| 2007/0230427 A1 | 10/2007 | Arseneault et al. | |
| 2007/0271006 A1 | 11/2007 | Golden et al. | |
| 2007/0276547 A1 | 11/2007 | Miller | |
| 2007/0290636 A1 | 12/2007 | Beck et al. | |
| 2007/0296221 A1 | 12/2007 | Blackman | |
| 2008/0040223 A1 | 2/2008 | Bridges et al. | |
| 2008/0040295 A1 | 2/2008 | Kaplan et al. | |
| 2008/0048854 A1 | 2/2008 | Olsen et al. | |
| 2008/0114499 A1 | 5/2008 | Hakim et al. | |
| 2008/0143302 A1 | 6/2008 | Pierce | |
| 2008/0167756 A1 | 7/2008 | Golden et al. | |
| 2008/0198747 A1 | 8/2008 | Young et al. | |
| 2008/0281663 A1 | 11/2008 | Hakim et al. | |
| 2009/0027932 A1 * | 1/2009 | Haines | H02J 9/062 363/95 |
| 2009/0160259 A1 | 6/2009 | Naiknaware et al. | |
| 2009/0296432 A1 | 12/2009 | Chapuis | |
| 2010/0006356 A1 | 1/2010 | Curry et al. | |
| 2010/0017045 A1 * | 1/2010 | Nesler | B60L 11/1824 700/296 |
| 2010/0109328 A1 * | 5/2010 | Li et al. | 290/44 |
| 2010/0133904 A1 * | 6/2010 | Klodowski | H02M 7/48 307/24 |
| 2010/0157632 A1 | 6/2010 | Batten et al. | |
| 2010/0157638 A1 | 6/2010 | Naiknaware et al. | |
| 2010/0181830 A1 * | 7/2010 | Fornage | H02J 3/383 307/18 |
| 2010/0308660 A1 * | 12/2010 | Willis | 307/77 |
| 2010/0320837 A1 | 12/2010 | Harrison | |
| 2011/0125336 A1 * | 5/2011 | Groves | F03D 9/002 700/287 |
| 2011/0156651 A1 * | 6/2011 | Christensen | B60L 3/0046 320/128 |
| 2011/0210613 A1 * | 9/2011 | O'Brien et al. | 307/82 |
| 2011/0273022 A1 * | 11/2011 | Dennis | H02J 1/10 307/72 |
| 2012/0049637 A1 * | 3/2012 | Teichmann | H02J 3/26 307/82 |
| 2012/0175949 A1 * | 7/2012 | Stiesdal et al. | 307/9.1 |
| 2014/0285010 A1 * | 9/2014 | Cameron | H02J 1/00 307/29 |

FOREIGN PATENT DOCUMENTS

| | | |
|---|---|---|
| EP | 1137148 | 9/2001 |
| JP | 2001 045796 | 2/2001 |
| JP | 2002 044870 | 2/2002 |
| JP | 2004 140991 | 5/2004 |
| JP | 2011 516761 | 10/2012 |
| KR | 10-0668118 | 1/2007 |
| KR | 10-2008-0110376 | 12/2008 |

(56) References Cited

FOREIGN PATENT DOCUMENTS

| KR | 1020117002422 | 1/2012 |
|---|---|---|
| NZ | 270840 | 8/1997 |
| TW | I 258235 | 7/2006 |
| TW | 098121895 | 10/2012 |
| WO | WO 2006/052410 | 5/2006 |
| WO | WO 2009/082721 | 7/2009 |
| WO | PCT/US2009/049039 | 1/2011 |
| WO | PCT/US2010/043883 | 1/2012 |
| WO | PCT/US2012/036657 | 11/2013 |
| WO | PCT/US2012/042294 | 12/2013 |

OTHER PUBLICATIONS

JP 2011 516761 Office Action, Oct. 17, 2012, Demand Energy Networks, Inc.
NZ 590217 Examination Report, Apr. 10, 2012, Demand Energy Networks, Inc.
PCT/US2009/049039 Search Rept., Feb. 11, 2010, Demand Energy Networks, Inc.
U.S. Appl. No. 60/822,047, filed Aug. 10, 2006, Kaplan.
U.S. Appl. No. 60/869,439, filed Dec. 11, 2006, Bridges et al.
U.S. Appl. No. 60/915,347, filed May 1, 2007, Bridges et al.
U.S. Appl. No. 60/980,663, filed Oct. 17, 2007, Bridges.
PCT/US2009/049039 Writ. Opin., Feb. 11, 2010, Demand Energy Networks, Inc.
PCT/US2010/043883 Search Rept., Mar. 17, 2011, Demand Energy Networks, Inc.
PCT/US2010/043883 Writ. Opin., Mar. 17, 2011, Demand Energy Networks, Inc.
PCT/US2012/036657 Search Rept., Aug. 30, 2012, Demand Energy Networks, Inc.
PCT/US2012/036657 Writ. Opin., Aug. 30, 2012, Demand Energy Networks, Inc.
PCT/US2012/042294 Search Rept., Jan. 22, 2013, Demand Energy Networks, Inc.
PCT/US2012/042294 Writ. Opin., Jan. 22, 2013, Demand Energy Networks, Inc.
"A Robust PHEV Logging Solutions from V2Green"; www.v2green.com, 6 pages (2008).
"Revolutionizing the Way You Think About Energy"; www.gridpopint.com, 28 pages (2008).

* cited by examiner

ENERGY SYSTEMS AND ENERGY SUPPLY METHODS

This application claims the benefit of and priority to a U.S. Provisional Patent Application titled "Power Conversion Switch," filed Jun. 13, 2011, having Ser. No. 61/496,400, and the teachings of which are incorporated herein by reference.

TECHNICAL FIELD

The present disclosure relates to energy systems and energy supply methods.

BACKGROUND

A variety of power producing systems are available or are being developed to produce energy from renewable and nonrenewable resources. Typically, these systems are interfaced with one power consuming system using custom circuitry. Though such custom circuitry may be effective, it is not flexible, intelligent, or easily configurable. Furthermore, existing systems do not allow for the flexibility of easily connecting a variety of different power consuming systems to such power producing systems.

BRIEF DESCRIPTION OF THE DRAWINGS

Example embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

An intelligent, flexible, power conversion switch is disclosed that converts electric power provided by one or more power providing systems in one or more power formats into formats suitable to be consumed by one or more power consuming systems. The power conversion switch monitors power from the power providing systems and directs the power to the power consuming systems according to desired criteria. The power conversion switch can be controlled and configured for a variety of different input and output power formats. In some embodiments, the power conversion switch may also be modular with removable modules that may be added or removed as needed.

Figure 1:
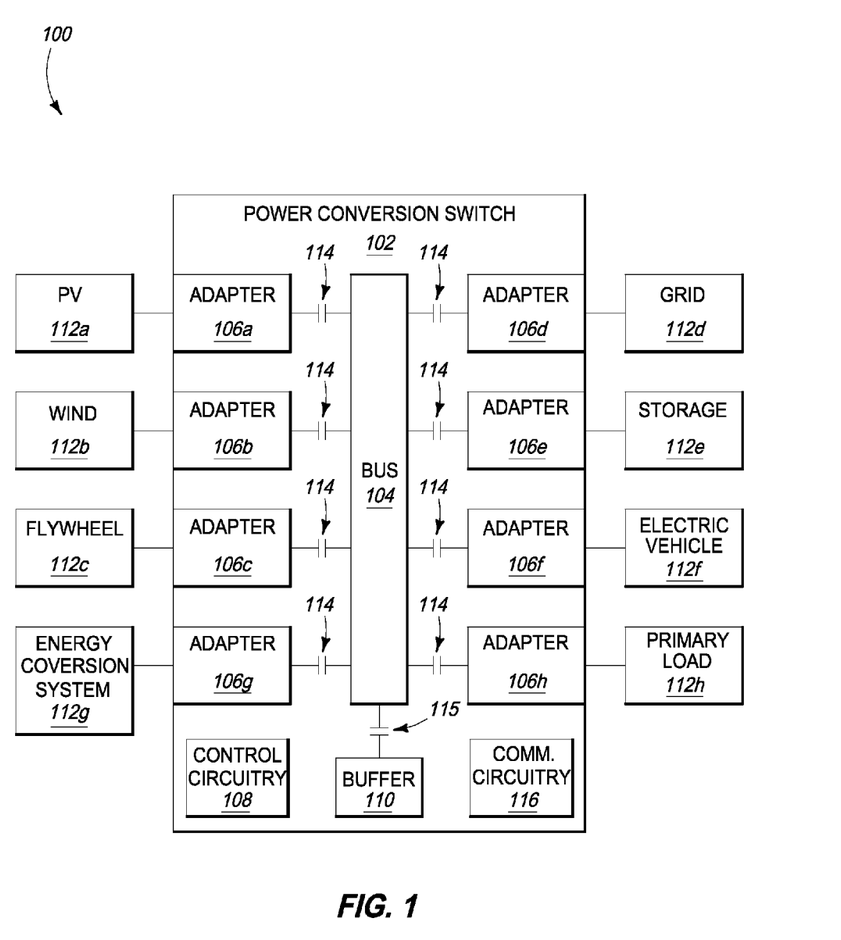
FIG. 1 is a schematic diagram of a power conversion switch according to one embodiment.

Referring to FIG. 1, a system 100 for switching electric power is illustrated. System 100 includes a power conversion switch 102 that transfers electric power between systems 112. System 100 may also be referred to as an energy system 100.

Some of systems 112 may supply electric power to power conversion switch 102 and may be referred to as power providing systems or source entities. For example, photovoltaic system 112a may provide electric power generated from the sun to power conversion switch 102 and wind system 112b may provide electric power generated from the wind to power conversion switch 102. Other systems may also provide electric power to power conversion switch 102. Storage system 112e may comprise one or more batteries that may provide power to power conversion switch 102. Power grid system 112d may be a mains source entity, such as a conventional public electric utility grid, that may provide AC electrical power (e.g., at 60 Hz in the United States) to power conversion switch 102. Other embodiments of grid system 112d are possible, for example, including a microgrid which may be installed upon an island or remote area where a public grid system is not available (or not utilized) or as another source of electrical energy in addition to the public grid system, or other type of electric power network which may serve different houses, establishments, etc. Flywheel system 112c or other mechanical storage system may convert kinetic energy to electric power and provide the resulting electric power to power conversion switch 102. Electric vehicle system 112f may provide electric power from electric vehicle batteries to power conversion switch 102. Energy conversion system 112g may also provide electrical power to power conversion switch 102.

One example embodiment of energy conversion system 112g includes a plurality of induction generators which are mechanically coupled with one another, for example via a rotatable shaft. One of the induction generators of the energy conversion system 112g may selectively operate as a motor that draws power from power conversion switch 102 and uses the drawn power to rotate a shaft of the other induction generator. A stator of the other induction generator may be connected to grid system 112d. If the induction generator operating as the motor rotates the shaft at a rotational speed greater than the synchronous speed of the other induction generator, the induction generator may supply electrical energy to the grid system 112d via the stator.

In addition, energy conversion system 112g may also provide electrical power to power conversion switch 102. In one embodiment, the stator of one of the induction generators of the system 112g may draw electrical energy from the grid system 112d and the respective induction generator may utilize the electrical energy to rotate the shaft. The other of the induction generators may operate as a generator which produces electrical energy as a result of the rotation of the shaft. The produced electrical energy or power may be provided to the power conversion switch 102 in one embodiment. Further details regarding an example energy conversion system 112g are discussed in a U.S. patent application titled "Energy Systems, Energy Devices, Energy Utilization Methods, and Energy Transfer Methods," filed Jun. 30, 2008, having Ser. No. 12/165405, now U.S. Pat. No. 8,097,967 which issued Jan. 17, 2012, and the teachings of which are incorporated herein by reference.

Some of systems 112 may consume electrical energy or power and be referred to as consuming entities. For example, storage system 112e may consume power supplied by power conversion switch 102 to charge batteries of storage system 112e. Similarly, power supplied by power conversion switch 102 may be pushed into power grid 112d, converted into kinetic energy by flywheel system 112c, and/or consumed by electric vehicle system 112f in charging electric vehicle batteries. As discussed above, energy conversion system 112g may also selectively consume electrical energy.

Some of systems 112 may consume electrical power at some moments in time and provide electric power at other moments in time. Such systems include power grid 112d, storage system 112e, electric vehicle system 112f, and flywheel system 112c. Others of systems 112 might only supply power, such as photovoltaic array system 112a and wind system 112b.

In some embodiments described further below, one or more adapters of the power conversion switch 102 may be configured to conduct electrical energy between respective systems 112 and the power conversion switch 102. One or more of the adapters may be configured to bi-directionally conduct electrical energy with respect to power conversion switch 102 while other adapters may only conduct electrical energy in one direction in one embodiment.

Although only a few different systems 112 are illustrated in FIG. 1, power conversion switch 102 may operate with many other power producing or power consuming systems not illustrated in FIG. 1.

In some implementations, power conversion switch 102 may be utilized to manage energy flows between one or more sources and loads of a common entity, such as a household, a business, a farm or other establishment, and which may also be a customer of a local utility or mains source of electrical energy. For example, the entity may have a primary load system 112h (e.g., a furnace, a water heater, appliances and other household goods or equipment and facilities of a business), and perhaps a plurality of secondary loads, such as an electrical vehicle 112f and energy conversion system 112g. In some embodiments, the primary load system 112h may have a higher priority to receive electrical energy compared with the secondary loads. In addition, other classifications of loads may also be possible for managing power or energy flows. For example, in some implementations, some loads may be classified as critical and are always to be powered or otherwise assigned the highest priority to receive electrical energy. In one more specific example, a hospital may have loads which need constant power to provide health care and the loads may be classified as critical to receive the highest priority of electrical energy.

Power conversion switch 102 may manage power flows between sources and loads and may be configured or tailored to provide the power flows differently in different implementations and which may include assuring that the energy requirements of the primary load system 112h are met in one embodiment. In one embodiment, control circuitry 108 of the power conversion switch 102 provides the management of the power flows according to rules which may prioritize the provision of electrical energy to consuming entities and control which supply entities provide electrical energy and how the electrical energy received from the various supplying entities is utilized.

The electric power provided to power conversion switch 102 by systems 112 may be in a variety of different formats. In fact, each of systems 112 might use a different format. As used herein, the term format refers to characteristics of electric power. Such characteristics may include frequency, phase, amplitude, current type (e.g., direct current, alternating current), waveform (e.g., sinusoidal, square, pulse width modulated, etc.), etc. Similarly, systems 112 that consume electrical power provided by power conversion switch 102 may expect the electric power provided by power conversion switch 102 to be in different formats. By way of example, wind system 112b might provide electric power in a DC format having a particular voltage and power grid 112d may consume electric power only if it is in an AC format having a particular frequency and phase. Power conversion switch 102 may provide electric power derived from wind system 112b to power grid 112d by converting the DC power provided by wind system 112b into AC power having the format expected by power grid 112d.

In doing so, power conversion switch 102 may utilize one or more adapters 106 connected to a bus system 104. Adapters 106 may convert electric energy from one format to a bus format used by bus system 104 in one embodiment. Electric energy may flow from a system 112 through adapter 106 to bus system 104 and/or from bus system 104 through adapter 106 to system 112. Adapters 106 may change one or more characteristics of the electric energy. For example, adapters may change a frequency, phase, or amplitude of the electric energy. Adapters may additionally or alternatively convert the electric energy from a DC format to an AC format, from an AC format to a DC format, from a first DC format to a different second DC format, or from a first AC format to a different second AC format. In addition, in one embodiment, the adapters 106 may individually control an amount of electrical energy which they provide into or out of the power conversion switch 102 at a given moment in time. While the example configuration of power conversion switch 102 of FIG. 1 includes eight adapters 106a-106h, other embodiments of switch 102 may include more or less numbers of adapters 106 for different implementations. Furthermore, the power conversion switch 102 may be scalable and adapters 106 may be added or removed from switch 102 based upon changes to the implementation where the switch 102 is implemented. Examples changes to the implementation may be adding or removing loads or power consuming entities with respect to the power conversion switch 102.

As discussed herein, the power conversion switch 102 may receive electrical energy from one or more systems 112, which may be referred to as source entities. In one embodiment, the source entities may be coupled with respective input adapters 106 which receive electrical energy from the source entities. Furthermore, some systems 112 may consume electrical energy provided by switch 102, and be referred to as consuming entities. In one embodiment, the consuming entities may be coupled with output adapters 106 which provide electrical energy to the consuming entities.

Some of the systems 112 coupled with the power conversion switch 102 may supply and consume electrical energy with respect to power conversion switch 102 at different moments in time and the adapters 106 coupled with such systems may be bi-directional and operate as input adapters when the respective systems 112 are supplying electrical energy and output adapters when the respective systems 112 are consuming electrical energy.

The adapters 106 of a given power conversion switch 102 may be configured the same or differently corresponding to the respective systems to which they are conducting electrical energy. In example embodiments, the adapters 106 may be configured as rectifiers, inverters, DC-to-DC converters, AC-to-DC or DC-to-AC converters, pulse width modulation switching arrangements, and variable frequency drives (VFDs). One example embodiment of a variable frequency drive is an Emerson Unidrive SP.

Power conversion switch 102 also includes control circuitry 108, which may control adapters 106. For example, control circuitry 108 may selectively enable and disable one or more of adapters 106. In some configurations, more than one of systems 112 may be simultaneously supplying power to bus system 104 of power conversion switch 102 and more than one of systems 112 may be simultaneously consuming power provided by power conversion switch 102.

As was briefly described above, at one moment in time, some of adapters 106 may be configured to convert electric power provided by some of systems 112 into a bus format. Others of adapters may provide power to some of systems 112 in a desired format by consuming electrical power provided by bus system 104 in the bus format. Many different bus formats are possible. For example, in one embodiment the bus format may be a DC voltage (e.g., 400v). In another embodiment, the bus format may be an AC voltage format. In yet another embodiment, some portions of bus system 104 may use a DC bus format and other portions of bus system 104 may use an AC bus format.

In some embodiments, bus system 104 may be configured to simultaneously implement a plurality of different, isolated power connections between different sets of supplying and consuming entities. For example, bus system 104 may be configured as a n×n meshed switch which may electrically connect any of the supplying entities with any of the consuming entities using a plurality of respective isolated power connections. In one embodiment, the bus system 104 may simultaneously connect one of the source entities with one of the consuming entities while also connecting another of the source entities with another of the consuming entities.

In some embodiments, individual adapters 106 may be selectively connected to bus system 104 via one or more contactors 114. Although illustrated in FIG. 1 as being separate from adapters 106, contactors 114 may, in some embodiments, be part of adapters 106.

Power conversion switch 102 may include buffer 110 connected to bus system 104. Buffer 110 may be embodied in many different ways and include a storage system configured to store electric energy in one embodiment. For example, buffer 110 may comprise one or more energy storage devices, such as batteries, capacitors, and/or inductors. In some embodiments, one or more energy storage devices may be shared between buffer 110 and storage system 112e. Different respective energy storage devices may also be utilized within the storage system 112e and buffer 110. In addition, a plurality of storage systems 112e may be coupled with a plurality of respective adapters 106 of a switch 102 in one embodiment.

At some moments in time, buffer 110 may help to absorb excess power provided to bus system 104 by adapters 106. For example, if power conversion switch 102 is receiving power from photovoltaic system 112a via adapter 106a and is supplying power to storage system 112e, power may flow from adapter 106a through bus system 104 to adapter 106f. However, if adapter 106f is unable to consume all or part of the power put on bus system 104 by adapter 106a, buffer may store such unconsumed power. Later, adapter 106f may be able to consume the power stored by buffer 110.

The ability of buffer 110 to store power put on bus system 104 that is not consumed by one of adapters 106 may be limited by a capacity of buffer 110 and therefore may be limited to a brief period. If power is being provided to bus system 104 by one of adapters 106 but is not being consumed by another one of adapters 106, buffer 110 may store the power provided to bus system 104 until buffer 110 reaches its capacity. As buffer 110 reaches its capacity, a voltage of bus system 104 may increase to the point that current no longer flows from the adapter 106 providing power to bus system 104 when buffer 110 reaches its capacity.

Similarly, the ability of buffer 110 to provide power to bus system 104 for consumption by one or more of adapters 106 configured to consume power from bus system 104 during times when no other adapter 106 is providing power to bus system 104 may be limited by the capacity of buffer 110. As the power stored by buffer 110 is depleted, the voltage of bus system 104 may decrease to the point that current no longer flows from bus system 104 to the adapters 106 configured to consume power from bus system 104.

Control circuitry 108 may open or close contactor 115 thereby connecting or disconnecting buffer 110 from bus system 104. Control circuitry 108 may disconnect buffer 110 from bus system 104, for example, during times when buffer 110 is full or is otherwise unavailable to store additional energy. In some embodiments, buffer 110 may comprise several modular storage components and control circuitry 108 may selectively connect individual ones of the components to bus system 104.

In some embodiments, control circuitry 108 may prevent buffer 110 from being filled to capacity. For example, control circuitry 108 may allow buffer 110 to store a predetermined amount of energy that is less than the capacity of buffer 110 and may prevent buffer 110 from storing more than the predetermined amount. The difference between the capacity of buffer 110 and the predetermined amount may be reserved for storage of energy generated by photovoltaic system 112a or wind system 112b. Accordingly, control circuitry 108 may prevent systems other than systems 112a and 112b from consuming more than the predetermined amount of energy, thereby reserving a portion of the capacity of buffer 110 for energy generated by systems 112a and 112b.

In some configurations, power conversion switch 102 may receive power from systems 112 at bus system 104 that is not smooth because it includes ripples, sawtooths, ramps, or other components. In these configurations, buffer 110 may absorb such non-smooth components, thereby smoothing the resulting power signal on bus system 104. In some cases, control circuitry 108 may monitor such non-smooth components and configure buffer 110 in a way best able to smooth the power signal on bus system 104.

In one embodiment, buffer 110 may include conditioning circuitry (not illustrated) that converts power received from bus system 104 into a format best suited for charging storage elements of buffer 110. For example, if buffer 110 includes batteries of a particular technology (e.g., lead acid, nickel metal hydride, lithium ion, etc.), the conditioning circuitry may convert power received from bus system 104 into a format best suited for the particular technology. For example, the format may include some amount of ripple rather than being smooth because the ripple may extend the life of the batteries. The conditioning circuitry may also control a rate at which buffer 110 is charged or discharged.

Figure 2:
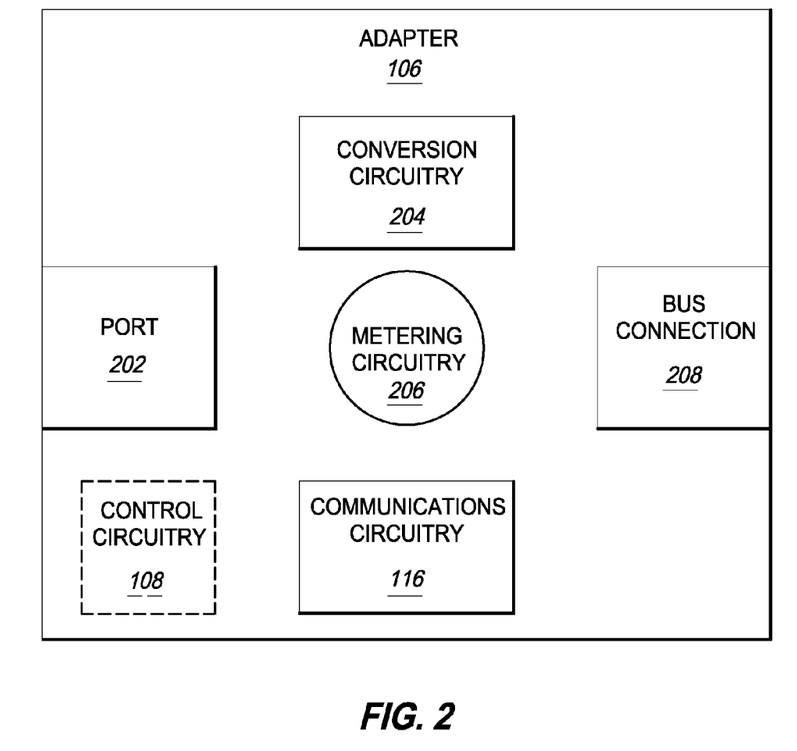
FIG. 2 is a schematic diagram of an adapter according to one embodiment.

As discussed above, adapter 106 converts electrical power from one format to another format. FIG. 2 illustrates components of adapter 106 including port 202, conversion circuitry 204, metering circuitry 206, and bus connection 208. Conversion circuitry 204 may convert electric power presented at port 202 in an external format (a format used external to power conversion switch 102) to a bus format (a format used by bus system 104) and provide the converted electric power at bus connection 208. In some embodiments, the bus format may be a DC format (e.g., 400v DC) and the external format may be an AC format. In these embodiments, conversion circuitry may convert AC power to DC power. In some embodiments, the bus format may be a DC format (e.g., 400v DC) and the external format may be different DC format (e.g., 12v DC). In these embodiments, conversion circuitry 204 may convert DC power at one voltage to DC power at a different voltage.

In some embodiments, the bus format may be an AC format (e.g., 60 Hz, 120v AC) and the external format may be a DC format. In these embodiments, conversion circuitry 204 may convert DC power to AC power. In some embodiments, the bus format may be an AC format (e.g., 60 Hz, 120v AC) and the external format may be a different AC format (e.g., 50 Hz, 240v AC). In these embodiments, conversion circuitry 204 may convert AC power having a first frequency, phase, and voltage to AC power having a different second frequency, phase, and voltage.

Furthermore, in some embodiments, adapter 106 may convert electric power presented in the bus format at bus connection 208 into the external format and present the converted electric power at port 202. In doing so, adapter 106 may perform one or more of the following conversions: AC to AC, AC to DC, DC to AC, and DC to DC. In such embodiments, adapter 106 may be described as working bi-directionally.

In one embodiment, conversion circuitry 204 may combine a plurality of individual signals to create a composite signal (e.g., in the external format) having desired characteristics (e.g., amplitude, shape, frequency, etc.). In one embodiment, the composite signal may be a periodic AC signal. Control circuitry 108 may control the duration and timing of a plurality of individual signals within conversion circuitry 204 to synthesize the desired composite signal. In one embodiment, conversion circuitry 204 may pulse width modulate each of the individual signals so that the combination of the individual signals is the desired signal.

In one embodiment, conversion circuitry 204 may comprise a plurality of insulated-gate bipolar transistors (IGBTs) or other devices configured to quickly switch large amounts of current (e.g., 1-100 Amps of current). Each of the IGBTs may be controlled (e.g., by adapter 106 and/or control circuitry 108) to generate one of the individual signals. The outputs of the IGBTs may be summed together to provide a desired composite output signal. In controlling each of the IGBTs, adapter 106 and/or control circuitry 108 may control when the IGBT is turned on and the duration for which the IGBT is turned on. As a result, the amplitude, frequency, shape, and other characteristics of the composite output signal may be controlled.

In synthesizing a signal having the external format, conversion circuitry 204 may consume power supplied by bus connection 208. For example, each IGBT may selectively conduct or not conduct DC power in a manner similar to a switch. In some embodiments, conversion circuitry 204 may generate a plurality of synthesized composite signals. For example, conversion circuitry 204 may generate a three-phase signal on a three-phase interface of port 202. Additionally or alternatively, conversion circuitry 204 may synthesize a signal having the bus format by consuming power supplied in the external format by port 202.

Conversion circuitry 204 may modify characteristics of the synthesized composite signal over time such as frequency, phase, amplitude, waveform shape (e.g., square wave, sine wave, etc.), and the like. For example, conversion circuitry 204 may alter the frequency of the synthesized signal by increasing and/or decreasing the frequency over time.

In some embodiments, conversion circuitry 204 may include filtering circuitry. The filtering circuitry may smooth or otherwise shape the composite signal prior to providing the composite signal on port 202 or bus connection 208. Conversion circuitry 204 may also include circuitry configured to match a phase and/or frequency of a reference signal. For example, conversion circuitry 204 may generate a signal that matches a frequency and/or phase of a signal of an external system 112 by monitoring the signal of the external system 112.

In some embodiments, adapter 106 may be capable of operating in many different modes in which different conversions are performed. For example, when configured in a first mode, adapter 106 may convert power presented at port 202 in a first external format (e.g., 120v 60 Hz AC) to a bus format (e.g., 400 v DC) and provide the converted power to bus system 104 via bus connection 208. While in the first mode, adapter 106 may also convert power presented at bus connection 208 in the bus format to the first external format and provide the converted power to a system 112 connected to port 202. When configured in a second mode, adapter 106 may convert power from a second external format (e.g., 14v DC) to the bus format, but might not allow power to flow from bus system 104 via bus connection 208 to port 202.

Other configurations are also possible. For example, in one configuration, adapter 106 may receive power from bus system 104 via bus connection 208, convert the received power, and provide the converted power to system 112 via port 202 as was described above. In addition, adapter 106 may reflect or transmit a conditioning signal onto bus system 104. The conditioning signal may produce a desirable effect such as changing a power factor of power of bus system 104, reducing or minimize signals reflected onto bus system 104 (e.g., by adapter 106), or otherwise alter a characteristic of the power of bus system 104.

Similarly, adapter 106 may reflect or transmit a conditioning signal toward system 112 that produces a desirable effect on a line connecting system 112 to adapter 106 or otherwise alters a characteristic of the power provided or consumed by system 112. Thus, the same hardware (adapter 106) may be configured in different modes to produce different results. Control circuitry 108 may configure adapter 106 to operate in a desired mode for a first period and later configure adapter 106 to operate in a different desired mode.

Power conversion switch 102 may also include communication circuitry 116. Communication circuitry 116 may communicate with one or more of systems 112 to relay information to systems 112 or receive information from systems 112. For example, communication circuitry 116 may communicate with electric vehicle system 112$f$ to receive information regarding the status of an electric vehicle. The information may indicate the current charge level of the electric vehicle, a desired time for charging the electric vehicle, an expected departure time for the electric vehicle, a temperature of the vehicle, a desired charging voltage and/or current profile for charging the vehicle, etc. Additional details regarding methods and apparatus for managing power flows with respect to electrical vehicles are discussed in Electric Vehicle Charging Methods, Battery Charging Methods, Electric Vehicle Charging Systems, Energy Device Control Apparatuses, and Electric Vehicles, filed Jul. 31, 2009, having Ser. No. 12/533834, naming Dave E. Curry as inventor, and the teachings of which are incorporated herein by reference.

Other information received by communication circuitry 116 from systems 112 may include, for example, an amount of energy stored by storage system 112$e$, pricing information from grid 112$d$, a number of solar panels on line or idle in system 112$a$, a number of wind turbines online or idle in system 112$b$, a current speed of flywheel 112$c$, an amount of energy delivered to power conversion switch 102 by one or more of systems 112, an amount of energy received by one or more of systems 112 from power conversion switch 102, etc.

In some cases, control circuitry 108 may provide information to systems 112 via communication circuitry 116. For example, control circuitry 108 may indicate to systems 112 that power conversion switch 102 has surplus energy or that energy is not available from power conversion switch 102. Furthermore, the information provided to systems 112 via communication circuitry 116 may include a price that an operator of power conversion switch 102 is willing to pay to receive power from one or more of systems 112 and a price that the operator is charging to provide power to one or more of systems 112.

Communication circuitry 116 may communicate with systems 112 via a wired connection (e.g., using conductive cables) and/or a wireless connection. In some embodiments, portions of communication circuitry 116 may be present in adapter 106. For example, adapter 106d may include communication circuitry 116 and communication circuitry 116 may be in electrical connection with grid 112d so that it can communicate with grid 112d using Power Line Carrier technology.

Power conversion switch 102 may be a modular device configured to accept many different types of adapters 106 with different capabilities (and therefore different costs). For example, some types of adapters may comprise a greater number of IGBTs than other types of adapters and may therefore be able to produce more sophisticated composite signals such as signals having smoother waveforms or higher frequencies as compared with adapters having fewer IGBTs.

Power conversion switch 102 may include a backplane connector that facilitates easy insertion and removal of adapters 106. In such embodiments, bus connection 208 of adapters 106 may be configured to connect with that backplane connector of power conversion switch 102. Using a modular architecture such as this enables power conversion switch 102 to be connected to a variety of different systems 112 while using a common control scheme (involving control circuitry 108) to control the various adapters 106 inserted into power conversion switch 102. Furthermore, adapters 106 may be added to power conversion switch 102 as needed. For example, initially power conversion switch 102 might include only two adapters 106. Over time, additional adapters 106 may be added to power conversion switch 102 to provide additional capacity and/or capability.

Returning now to FIG. 2, Port 202 includes a connector by which adapter 106 is connected to a system such as one of the systems 112 of FIG. 1. The number of conductors used by port 202 may vary depending on the external format. For example, the number of conductors may be different if the external format is a three-phase AC format than if the external format is a low-voltage DC format.

Bus connection 208 includes a connector by which adapter 106 is connected to bus system 104. The number of conductors used by bus connection 208 may vary depending on the bus format. For example, the number of conductors may be different if the external format is a three-phase AC format than if the external format is a low-voltage DC format.

Metering circuitry 206 may measure one or more of the following: power flowing from adapter 106 to bus system 104 via bus connection 208, power flowing from bus system 104 to adapter 106 via bus connection 208, power flowing from adapter 106 to system 112 via port 202, and power flowing from system 112 to adapter 106 via port 202. Metering circuitry 206 may record measurements and make measurements available to control circuitry 108. Furthermore, metering circuitry 206 may generally be controlled by control circuitry 108.

In measuring power, metering circuitry 206 may measure one or more characteristics of the power and provide the measurements to control circuitry 108, which may adjust conversion circuitry 204 based on the measurements to control the conversion process and produce converted power having desirable characteristics. The characteristics measured by metering circuitry 206 may include line current, phase current, voltage, RMS/peak power, real power, reactive power, apparent power (e.g., measured in volt-amperes), power factor, harmonics, harmonic distortion, etc.

Returning now to FIG. 1, control circuitry 108 is configured to control the operation of power conversion switch 102 by controlling adapters 106. Furthermore, in some cases, control circuitry 108 may control bus system 104 and/or buffer 110. Control circuitry 108 is part of power conversion switch 102. However, in some embodiments, portions of control circuitry 108 may be located in each adapter 106 and in bus system 104 and buffer 110. For example, control circuitry 108 may include a primary microprocessor associated with power conversion switch 102 in communication with small microprocessors or other control circuitry distributed among adapters 106.

Control circuitry 108 may perform a variety of functions related to monitoring and controlling elements of power conversion switch 102. Control circuitry 108 may monitor characteristics of bus system 104 such as a bus voltage. This may be done by control circuitry 108 measuring the voltage directly. Alternatively, bus system 104 may include its own measurements circuitry for measuring the voltage and may simply communicate a measured voltage value to control circuitry 108. Control circuitry 108 may use the voltage information in a variety of ways. For example, based on the voltage information, control circuitry 108 may enable or disable one or more of adapters 106. Control circuitry 108 may additionally or alternatively monitor a voltage or capacity of buffer 110. Further, control circuitry 108 may configure adapters 106 in different modes as was described above.

Control circuitry 108 may control the operation of contactors 114 and thereby control which of adapters 106 are electrically connected to bus system 104 at any given moment in time. Furthermore, control circuitry 108 may control the contactors based on measurements made on bus system 104 and or measurements made in adapters 106. For example, control circuitry 108 may determine parameters characterizing bus system 104 (e.g., voltage, frequency, phase, waveform, etc.).

Based on the parameters, control circuitry 108 may then control a selected adapter 106 so that characteristics of power presented by adapter 106 at bus connection 208 match (e.g., in voltage, frequency, phase, and/or waveform) or are within an acceptable range of the characteristics of the bus system 104 prior to closing contactor 114 associated with the selected adapter 106. Doing so may reduce and/or minimize reflections and/or current surges that may occur due to differences in characteristics between bus system 104 and power presented by adapter at bus connection 208. Control circuitry 108 may similarly control operation of contactors (not illustrated) between systems 112 and adapters 106 to ensure that characteristics of power presented by adapters 106 at ports 202 matches or is acceptably close to power present in systems 112 prior to electrically connecting systems 112 to adapters 106 via the contactors.

Control circuitry 108 may include one or more processors that execute commands. The commands may be referred to as software.

In some cases, control circuitry 108 may control and/or monitor power conversion switch 102 (including adapters 106) on a real time basis. For example, control circuitry 108 may monitor an amount of power provided to bus system 104 by adapters 106 and take immediate action (e.g., changing a configuration of one or more of adapters 106) if one or more criteria is satisfied. The criteria may be related to an operating parameter of power conversion switch 102, such as a temperature, voltage, current, phase, frequency, or other parameter associated with operation of power conversion switch 102. For example, control circuitry 108 may regularly monitor the voltage of bus system 104. If control circuitry 108 determines that the voltage has risen above a threshold, control circuitry 108 may take action such as enabling adapter 106e to consume power from bus system 104.

Additionally or alternatively, control circuitry 108 may control and/or monitor power conversion switch 102 (including adapters 106) on a non-real time basis. For example, control circuitry 108 may collect data from adapters 106 (including data collected by metering circuitry 206) over time and may analyze the data. Based on the analysis of the data, control circuitry 108 may take action such as changing a configuration of power conversion switch 102 or adapters 106. For example, control circuitry 108 may enable or disable one of adapters 106 or may adjust a parameter of one of adapters 106. Control circuitry 108 may take other actions based on the analysis such as communicating information or alarms to a system operator or to a management system external to power conversion switch 102.

As will be further discussed below, control circuitry 108 may prioritize which systems are allowed to provide power to power conversion switch 102 at any given moment in time and which systems 112 are allowed to draw power from power conversion switch 102 at any given moment in time according to rules which may be source and/or load prioritization rules, business rules and/or price rules in some embodiments. In one more specific embodiment, the rules may specify an order of the source entities to provide electrical energy to the power conversion switch 102 and an order of consuming entities which consume electrical energy from the power conversion switch 102.

In one example, control circuitry 108 may, in accordance with the rules, assign high priorities to respective adapters 106a and 106b coupled with photovoltaic system 112a and wind system 112b for providing electrical energy to power conversion switch 102. Accordingly, control circuitry 108 may configure adapter 106a to convert power made available by photovoltaic system 112a to the bus format of bus system 104 and to provide the converted power to bus system 104. Similarly, control circuitry 108 may configure adapter 106b to convert power made available by wind system 112b to the bus format of bus system 104 and to provide the converted power to bus system 104. Control circuitry 108 may monitor an amount of power delivered to bus system 104 by adapters 106a and 106b using metering circuitry (discussed above) of adapters 106a and 106b.

Depending upon demands of the consuming entities, a desire to store electrical energy, or other reasons, the control circuitry 108 may enable additional adapters 106 according to the rules to receive additional electrical energy from additional sources such as flywheel system 112c, grid system 112d, storage system 112e, electrical vehicle system 112f, and energy conversion system 112h.

Control circuitry 108 may also utilize the rules to further configure one or more of adapters 106c, 106d, 106e, and 106f to consume the power put on bus system 104. For example, one priority rule may be to assure that primary load 112h receives sufficient energy before electrical energy is applied to other consuming entities, such as consuming entities 112d, 112e, 112f, or 112g. Control circuitry 108 may enable respective adapters 106h, 106d, 106e, 106f or 106g to consume power from bus system 104 according to the rules by converting power from bus system 104 into respective formats used by the respective consuming entities.

In another specific example, if control circuitry 108 determines that adapter 106f is not able to consume all of the power provided to bus system 104 by adapters 106a and 106b, control circuitry 108 may enable an adapter 106 next in line according to the priority to consume power from bus system 104 in addition to adapter 106f. For example, adapter 106e may be the next adapter in line according to the priority and control circuitry 108 may enable adapter 106e to consume power from bus system in addition to adapter 106f. If control circuitry 108 determines that the combination of adapters 106e and 106f still does not consume all of the power provided to bus system 104 by adapters 106a and 106b, control circuitry 108 may enable yet another adapter 106 (e.g., adapter 106c). In some priority schemes, adapter 106d may be the lowest priority adapter since enabling adapter 106d sends power to electric grid 112d rather than retaining the electric for local use.

In other priority schemes, the priority of adapter 106d may vary based on the time of day. For example, during times when a price paid by an operator of grid 112d for power pushed into grid 112d is very high, adapter 106d may be the first adapter in the priority scheme because pushing power to grid 112d may be financially advantageous. During times when the price paid by the grid operator for power pushed into grid 112 is very low, adapter 106d may be last in the priority scheme.

Furthermore, control circuitry 108 keep track of periods of time when adapters 106 are not able to consume power from bus system 104. For example, there may be periods of time when grid 112d is unable or unwilling to accept power or there may be periods of time when storage 112e is at capacity and is not able to accept additional power. Control circuitry 108 may change the priority of adapters 106 based on such information or may skip over adapters in the priority during such periods.

Control circuitry 108 may monitor the power provided to bus system 104 by adapters 106a and 106b over time. If the amount of power drops, control circuitry 108 may disable one or more of adapters 106c, 106d, 106e, and 106f so that the amount of power consumed from bus system 104 substantially matches the amount of power provided to bus system 104 by adapters 106a and 106b. As was described above, buffer 110 may provide or consume power during times when the amount of power provided to bus system 104 by adapters 106 and the amount of power consumed from bus system 104 by adapters 106 do not match exactly.

Once the vehicles of electric vehicle system 112f have been charged, control circuitry 108 may disable adapter 106f. If power is still being provided to bus system 104 by adapters 106a and 106b, control circuitry 108 may enable another adapter (e.g., adapter 106e) to consume such power.

In another application, control circuitry 108 may enable adapter 106e to convert energy stored by storage system 112e and to put the converted energy on bus system 104 in the form of power that flows to adapter 106d and then out to grid 112d. Similarly, control circuitry 108 may allow energy stored by electric vehicles of system 112f or by flywheel 112c to be converted to power on bus system 104 that then flows to grid 112d via adapter 106d.

Control circuitry 108 may be programmed with priorities intended to accomplish particular objectives. For example, as was described above, one objective may be to use any/all power provided by photovoltaic system 112a and wind system 112b. Another objective may be to charge vehicles of electric vehicle system 112f using renewable energy first (e.g., from systems 112a and 112b), stored energy second (e.g., from systems 112c, and 112e), and grid power (from grid 112d) last.

Control circuitry 108 collect information generated by the metering circuitry of the adapters. Such information may be used in billing or reconciliation operations. For example, information gathered by control circuitry 108 related to an amount of energy consumed from grid 112d and provided to grid 112d may be compared and/or reconciled with similar information collected by operators of grid 112d. In another example, information gathered by control circuitry 108 related to an amount of energy consumed by electric vehicle system 112f may be used to bill operator of system 112f.

In some embodiments, an operator of power conversion switch 102 may alter the behavior of control circuitry 108 by changing the software executed by control circuitry 108. Furthermore, in some embodiments, control circuitry 108 may drastically alter the operation of an adapter by changing parameters utilized by the adapter. For example, control circuitry 108 may drastically alter the waveform of power signals generated by an adapter by changing when and for how long IGBTs of the adapters conduct power.

In one embodiment, adapter 106 may be capable of producing different qualities of output power signals and control circuitry 108 may alter the operation of adapter 106 to produce a desired quality of output power signal. For example, adapter 106 may be capable of producing a first power quality having a smooth, sinusoidal shape with minimal harmonic distortion, a second power quality not as smooth as the first power quality and having some harmonic distortion, and a third power quality less smooth than the second power quality and having significant harmonic distortion. Control circuitry 108 may select one of these three example qualities based on user input. For example, a user may select which quality level is to be produced by adapter 106. In some cases, an operator of power conversion switch 102 may charge more for higher quality levels.

As an alternative to one adapter 106 that can be configured to produce various quality levels, different adapters 106 may each have different quality levels and an operator of power conversion switch 102 may purchase and install an adapter 106 having a desired quality level for a particular application.

Other aspects of adapter 106 may also be configurable. For example, in one adapter 106 used to charge batteries, the rate at which the battery is charged may be configurable. The shape of the waveform of the charging signal may also be configurable since different battery technologies (e.g., lead acid, nickel metal hydride, lithium ion, etc.) may prefer different charging shapes and/or charging rates. Alternatively, different adapters 106, each customized for a particular battery technology may be constructed and may be installed in power conversion switch 102 as needed.

Power conversion switch 102 may be used in a variety of locations. For example, power conversion switch 102 may be used in a residential home to switch power between the home's electrical equipment in one embodiment. For example, the power conversion switch 102 may be utilized to manage power flows between electrical energy sources, such as solar panels, electric vehicles, battery storage, and grid connections, as well as consuming entities or loads, such as primary loads and secondary loads. In another example, power conversion switch 102 may be used in a commercial building to switch power between the various power consuming and producing systems in the commercial building.

In some embodiments, power conversion switch 102 may operate autonomously without external control. In such embodiments, control circuitry 108 may operate power conversion switch 102. In other embodiments, power conversion switch 102 may communicate with and/or be controlled by external systems 112 or devices via a communications network.

Figure 3:
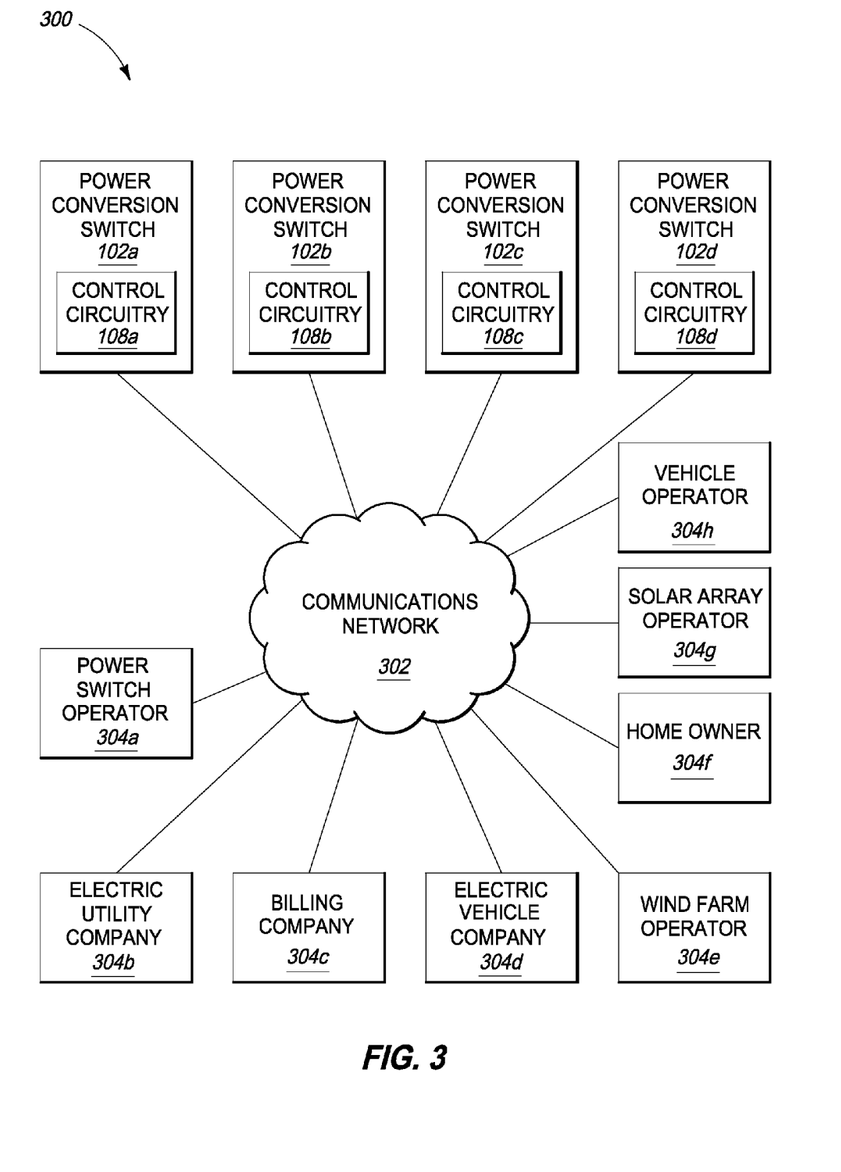
FIG. 3 is a schematic diagram of a system which includes a plurality of power conversion switches according to one embodiment.

FIG. 3 illustrates a system 300 in which power conversion switches 102 communicate with and/or are controlled by external systems 304 via communications network 302 and control circuitry 108. System 300 includes four power conversion switches 102a, 102b, 102c, and 102d by way of example. Other systems may include more or fewer power conversion switches.

Power switch operator 304a may collect data from control circuitry 108 of power conversion switches 102 and use the collected data to perform operations and maintenance tasks. Further, power switch operator 304a may control power conversion switches 102 by, for example, providing configuration information to control circuitry 108 with the intent that configuration information be used to configure adapters 106 of power conversion switches 102.

Power conversion switches 102 and/or power switch operator 304a may provide usage, billing, or other information to electric operating company 304b (e.g., a utility company, operator of a power grid, etc.). For example, information describing an amount of power provided to grid 112d by one or more of power conversion switches 102 may be provided to electric operating company 304b. Additionally or alternatively information describing an amount of power consumed from grid 112d by one or more of power conversion switches 102 may be provided to electric operating company 304b. Furthermore, power conversion switches 102 and/or power switch operator 304a may receive price information describing rates for power consumed from grid 112d from electric operating company 304b. The price information may include different prices for different times of day.

Billing company 304c may receive usage information from power conversion switches 102 and/or power switch operator 304a and may use the usage information to determine amounts of money owed between parties. For example, power conversion switch 102a may store power provided by wind system 112b in storage system 112e and later provide this stored energy to grid 112d.

In doing so, an operator of power conversion switch 102a may owe wind farm operator 304e money for the power provided by wind system 112b and may owe solar array operator 304g money for the power provided by photovoltaic system 112a. Furthermore, the operator of power conversion switch 102a may be owed money from electric operating company 304b for the power provided by power conversion switch 102a to grid 112d.

Billing company 304c may receive information describing the amounts of power provided to power conversion switch 102a by wind system 112b and photovoltaic system 112a and the amount of power provided to grid 112d by power conversion switch 102a from control circuitry 108a via communications network 302. Billing company 304c may use the information to determine amounts owed by the operator of power conversion switch 102a and electric operating company 304b.

Electric vehicle company 304d may receive information from power conversion switches 102 and/or power switch operator 304*a* via communications network 302. The information may describe amounts of power provided to electric vehicle system 112*f* by power conversion switches 102 and when the amounts of power were provided. Furthermore, electric vehicle company 304*d* may provide a forecast of its desired power consumption to power conversion switches 102 and/or power switch operator 304*a*.

Wind farm operator 304*e* may receive information from power conversion switches 102 and/or power switch operator 304*a* via communications network 302. The information may describe amounts of power provided to power conversion switches 102 by wind system 112*b* and when the amounts of power were provided. Furthermore, wind farm operator 304*e* may provide a forecast of its anticipated ability to provide power in the future to power conversion switches 102 and/or power switch operator 304*a*. Power conversion switches 102 and/or power switch operator 304*a* may use the information to schedule power consumption (e.g., by storage system 112*e*, electric vehicle system 112*f*, flywheel 112*c*, and/or grid 112*d*) during times when wind system 112*b* will be providing power to power conversion switches 102.

Solar array operator 304*g* may receive information from power conversion switches 102 and/or power switch operator 304*a* via communications network 302. The information may describe amounts of power provided to power conversion switches 102 by photovoltaic array 112*a* and when the amounts of power were provided. Furthermore, solar array operator 304*g* may provide a forecast of its anticipated ability to provide power in the future to power conversion switches 102 and/or power switch operator 304*a*. Power conversion switches 102 and/or power switch operator 304*a* may use the information to schedule power consumption (e.g., by storage system 112*e*, electric vehicle system 112*f*, flywheel 112*c*, and/or grid 112*d*) during times when photovoltaic array 112*a* will be providing power to power conversion switches 102.

Vehicle operator 304*h* may provide information to power conversion switch 102*a* and/or power switch operator 304 describing when the operator would like to have an electric vehicle charged by electric vehicle system 112*f*. The information may be used to schedule power to be consumed by power conversion switch 102*a* for the purpose of charging the electric vehicle via adapter 106*f* and electric vehicle system 112*f*.

Homeowner 304*f* may receive information from power conversion switch 102*a* (which may be located at the home) and/or power switch operator 304*a* describing power consumed by power conversion switch 102*a* and power provided to power conversion switch 102*a*. Homeowner 304*f* may use the information to make decisions regarding future consumption or generation of power in the home.

Figure 4:
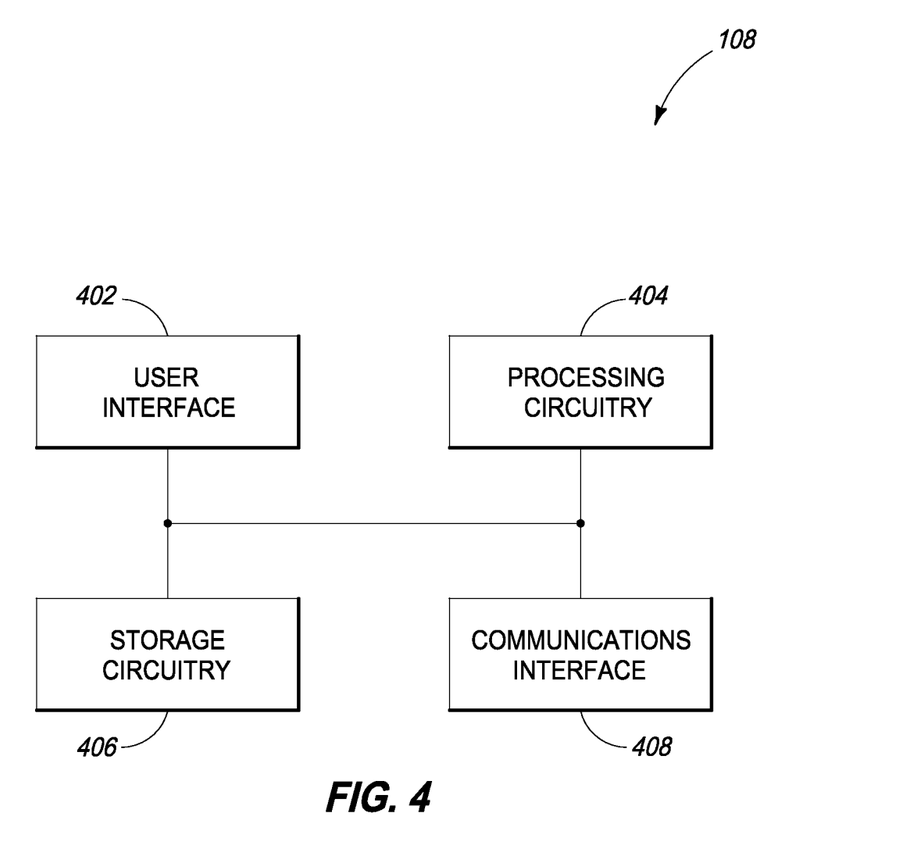
FIG. 4 is a block diagram of control circuitry according to one embodiment.

Referring to FIG. 4, one embodiment of control circuitry 108 is shown. In the illustrated example embodiment, control circuitry 108 includes a user interface 402, processing circuitry 404, storage circuitry 406, and a communications interface 408. Other embodiments of control circuitry 108 are possible including more, less and/or alternative components.

User interface 402 is configured to interact with a user including conveying data to a user (e.g., displaying visual images for observation by the user) as well as receiving inputs from the user. For example, user interface 402 may convey status information and receive user commands regarding operations of system 100. Example users include homeowners or an operations manager of a commercial building.

In one embodiment, processing circuitry 404 is arranged to process data, control data access and storage, issue commands, and control other desired operations. Processing circuitry 404 may comprise circuitry configured to implement desired programming provided by appropriate computer-readable storage media in at least one embodiment. For example, the processing circuitry 404 may be implemented as one or more processor(s) and/or other structure configured to execute executable instructions including, for example, software and/or firmware instructions. Other exemplary embodiments of processing circuitry 404 include hardware logic, PGA, FPGA, ASIC, state machines, and/or other structures alone or in combination with one or more processor(s). These examples of processing circuitry 404 are for illustration and other configurations are possible.

Processing circuitry 404 may also manage power flows throughout the power conversion switch 102 in one embodiment. For example, the processing circuitry 404 may access information from a plurality of sources and control how electrical energy is received and supplied with respect to power conversion switch 102 using the information.

In some illustrative examples, processing circuitry 404 may access rules which establish priorities of the primary and secondary loads to receive electrical energy from the power conversion switch 102 and which source entities supply electrical energy to the power conversion switch 102. Processing circuitry 404 may access price information, for example of electrical energy upon a grid system, to make decisions regarding utilization of electrical energy. Processing circuitry 404 may also access information regarding status of systems coupled with the power conversion switch 102, such as state-of-charge of storage systems and state-of-charge of electric vehicles. Processing circuitry 102 may also access information regarding power generation of variable sources, such as photovoltaic and wind sources, as well as forecast information of future generation of electrical energy from the variable sources.

Storage circuitry 406 is configured to store programming such as executable code or instructions (e.g., software and/or firmware), electronic data, databases, image data, or other digital information and may include computer-readable storage media. At least some embodiments or aspects described herein may be implemented using programming stored within one or more computer-readable storage medium of storage circuitry and configured to control appropriate processing circuitry 404.

The computer-readable storage medium may be embodied in one or more articles of manufacture which can contain, store, or maintain programming, data and/or digital information for use by or in connection with an instruction execution system including processing circuitry 404 in the exemplary embodiment. For example, exemplary computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications interface 408 is arranged to implement communications of control circuitry 108 with respect to other devices and networks, such as other control circuits 108 and communications network 302.

As discussed above, the system 100 may be utilized to provide electrical energy to a primary load system in some embodiments. In some implementations of system 100, provision of sufficient electrical energy to the primary load system may be of paramount importance (e.g., heating, powering business equipment, powering elevators, hospital equipment, etc.). For example, in conventional arrangements, the primary loads of an entity may have received all of their energy requirements from a mains supply entity, such as a public utility. The energy system 100 discussed herein according to some embodiments may utilize energy from a mains supply entity as well as from one or more additional or supplemental sources of electrical energy, for example, for monetary savings and/or environmental factors. However, according to some embodiments, the adequate supply of electrical energy to the primary load system may be of paramount importance regardless of price or other concerns.

As discussed herein, system 100 may be utilized in some implementations where one or more variable source provides electrical energy. For example, a photovoltaic and wind sources may provide variable amounts of electrical energy corresponding to variable environments in which the sources operate. In one embodiment, system 100 implements firming operations where the energy requirements of the primary load system are met (as well as one or more secondary loads in some arrangements), perhaps using electrical energy from one or more variable source of electrical energy.

For example, at a given moment in time, the primary load system and secondary loads may require 120 kW for proper operation. At the given moment in time, photovoltaic and wind systems may be able to provide 90 kW of electrical energy. In one embodiment, the control circuitry may utilize electrical energy from one or more additional source, such as the grid system and/or one or more storage systems, to provide 30 kW of additional electrical energy to meet the requirements of the loads.

At another moment in time, the primary load system may only require 50 kW of electric energy for proper operation while the photovoltaic and wind systems may still be providing 90 kW of electrical energy. The control circuitry may utilize the excess 40 kW of electrical energy to one or more of charge the storage systems, charge an electrical vehicle, and/or provide electrical energy to the electrical grid, which may be referred to as play-through. For example, the operator of the grid system may purchase electrical energy supplied to the grid system during peak periods of usage of electrical energy for stability, cost, or other reasons.

In one embodiment, the energy system provides load following operations where the load requirements of electrical energy of the primary load system and perhaps one or more secondary load system may vary, and the energy system may provide varying amounts of electrical energy to the loads in accordance with the energy requirements. For example, electrical energy from one or more source entities may be utilized to implement the load following operations during variable demands of the loads. The source entities being utilized may be selected based upon prioritization rules, prices of electrical energy, and availability of electrical energy from various source entities in some examples.

In accordance with one aspect, the energy system may also implement demand or time shifting operations. For example, there may be an excess of electrical energy available at a moment in time compared with the energy requirements of the primary and secondary load systems. In one embodiment, control circuitry of the energy system may access information regarding price of electrical energy from the grid system at the moment in time to determine if the excess electrical energy should be stored within the energy system or played-through to the grid system.

For example, the energy system may utilize a first threshold where the excess electrical energy may be stored if the price paid by the operator of the grid system for electrical energy at the period of time when the excess energy is available is less than the first threshold. The energy system may also utilize a second threshold where the energy system may provide electrical energy from the storage system to the grid system if the price being paid for the electrical energy is greater than the second threshold at the respective period in time when the energy is available. In some generalized embodiments, the energy system may draw and store electrical energy from the grid system when the price of electrical energy upon the grid system is low and discharge electrical energy system to the grid system when the price of electrical energy is high.

Furthermore, the control circuitry may also monitor states-of-charge of one or more energy storage devices of an energy storage system and perhaps an electric vehicle. The excess energy may be utilized to bring the energy storage devices and electric vehicle to desired states-of-charge before being provided to the grid system. Otherwise, excess electrical energy may be applied immediately to the grid system if the energy storage devices and electric vehicle are already at desired states-of-charge.

Forecasts of estimated price information of electrical energy in the future may also be utilized to determine whether electrical energy should be stored internally of the energy system at a given moment in time or supplied to the grid system. For example, if the future price of electrical energy upon the grid system is expected to increase, then the electrical energy may be stored internally of the energy system. Alternatively, if the future price of electrical energy upon the grid system is expected to decrease, then the electrical energy may be provided to the grid system.

The energy system may also be configured to implement peak shaving operations in some embodiments. For example, as discussed above, the energy requirements of the primary load system and perhaps one or more secondary load systems may vary throughout the day. The energy system may have an associated price threshold it is willing to pay for electrical energy from the grid system. During some moments in time, the energy requirements of the loads may increase to a sufficient amount that the operator of the grid system will charge a surcharge due to the increased amount of electrical energy being consumed by the energy system. In one embodiment, the control circuitry may monitor the consumption and utilize electrical energy from sources other than the grid system to maintain the amount of electrical energy utilized from the grid system below the surcharge while still meeting the energy requirements of the loads. For example, the control circuitry may draw an amount of electrical energy from the grid system up to the surcharge amount charged by the grid system, and use electrical energy from other sources to meet the requirements of the loads above the surcharge. In addition or another embodiment, the control circuitry may also provide reduced power to one or more of the loads to reduce the energy requirements of the loads until a price of electrical energy from the grid system falls or the energy demands of others of the loads decrease.

In one more specific example, the energy system may be utilized in an apartment or office building. During peaks times of energy usage, such as during mornings when elevators are continually operating or during afternoons when air conditioning is utilized, electrical energy may be used from the grid system as well as other sources, such as photovoltaic, wind or storage sources. Furthermore, secondary loads, such as charging electrical vehicles, may be reduced until the peak usage of energy passes.

Accordingly, in one embodiment, the amount of electrical energy being consumed by one or more loads, such as the primary and secondary loads, may be monitored and electrical energy from different source entities may be used to meet the requirements of the loads. Electrical energy from one of the source entities may be provided to the primary load at one moment in time. If the consumption of the primary load increases beyond the capability of the one source entity, then another source entity (e.g., an energy storage system) may also be utilized to provide energy to the primary load. In another example, the cost of energy from the one source entity may increase and the control circuitry may utilize electrical energy from a different source entity which may provide the electrical energy at reduced cost. Other embodiments are possible.

The energy system may also provide dispatchable load operations in some embodiments where the energy system may consume electrical energy at a desired moment in time, perhaps to assist the grid system. For example, the energy system may have a plurality of different loads as described above. In some embodiments, the entity utilizing the energy system may be flexible with respect to one or more loads as to when the load(s) consume electrical energy from the energy system (i.e., a manufacturing facility may need to perform an operation but may be flexible as to when the operation needs to be performed).

Furthermore, from the viewpoint of the grid system, it may be desirable for some loads to come on-line to consume excess amounts of energy which may be present upon the grid system (e.g., during periods of high output from photovoltaic and/or wind systems). In one embodiment, the operator of the grid system may generate and send a request that the energy system consume additional electrical energy. As a result of receiving the request, the control circuitry of the energy system may increase consumption of electrical energy by one or more loads which was not consuming electrical energy (or was consuming electrical energy at a reduced amount) when the request was received.

In a more specific example, there may be an excess amount of electrical energy available from renewable energy sources feeding the grid system, and accordingly, it is beneficial to the grid system for the excess amount of electrical energy to be consumed for stability of the grid system (and perhaps at reduced prices to the entity operating the energy system).

As discussed above, forecasts of various parameters, such as price and amount of energy from different sources, may be utilized to make decisions regarding power flows. For example, using price information regarding electrical energy from the grid system, a decision may be made whether to store excess electrical energy within the storage system or pass the excess electrical energy through to the grid system. Another example is when additional electrical energy may be needed (e.g., for the primary and secondary loads) and a forecast of when an electrical vehicle is needed to be ready for use may be used to determine whether electrical energy stored within the electric vehicle may be utilized to supply the energy. In another example, weather forecasts of wind and sun may be utilized to determine if electrical energy stored within the storage system should be used to power primary and secondary loads to enable the storage system to accept expected electrical energy in the future from the variable sources of energy including the wind and photovoltaic systems.

As discussed above, the energy system may be modular and energy storage may also be scalable in one embodiment. For example, the storage system and/or buffer may include different numbers of storage devices (e.g., batteries) in different implementations to provide different storage capacities. Furthermore, the storage system may also include different types of storage devices (i.e., batteries of different types of chemistries, such as lead-acid and/or lithium, capacitors, inductors) which may be coupled with a plurality of respective different adapters which may be tailored or configured to conduct electrical energy with respect to the different types of storage devices. The adapters may be configured to provide optimum charging and/or discharging of the different types of storage devices in one more specific example.

At different times, it may be beneficial to charge storage devices having a given chemistry and coupled with one adapter using electrical energy from one of the source entities while charging storage devices of a different chemistry using a different adapter and perhaps using electrical energy from a different source entity. For example, the storage devices of different chemistries may be well-suited for charging from respective different types of sources of electrical energy, and when the sources are producing electrical energy, the energy system may be configured to use the produced energy from the sources to charge respective ones of the different types of storage devices having different chemistries. In another embodiment, electrical energy upon the bus 104 may be used to simultaneously charge storage devices having different chemistries.

Having a plurality of storage devices which may be coupled with plural adapters also provides redundancy of energy storage and flexibility with servicing where the storage devices coupled with one adapter may be off-line for service while the storage devices coupled with another adapter may remain on-line for use within the energy system. Furthermore, in some embodiments, one or more storage devices having a given chemistry may be charged while energy is discharged to one or more loads via another adapter which is coupled with other storage devices having a different chemistry. In addition, storage devices coupled with one adapter may be configured to supply energy to one or more loads while storage devices coupled with a different adapter may be configured to supply energy to one or more different loads. In this described example embodiment, power conversion switch 102 may be configured such that different groups of storage devices may be configured to supply electrical energy to respective different loads or types of loads.

In summary, an intelligent, flexible, power conversion switch has been described in one embodiment that converts electric power provided by one or more power providing systems 112 in one or more power formats into formats suitable to be consumed by one or more power consuming systems. The power conversion switch monitors power from the power providing systems 112 and directs the power to the power consuming systems 112 according to desired criteria. The power conversion switch can be controlled and configured for a variety of different input and output power formats and for use in varied applications and implementations.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

What is claimed is:

1. An energy system comprising:
   a bus system configured to conduct electrical energy;
   a plurality of input adapters electrically coupled with the bus system and configured to electrically couple with a plurality of respective source entities which are individually configured to provide electrical energy;
   a plurality of output adapters electrically coupled with the bus system and configured to electrically couple with a plurality of respective consuming entities which are individually configured to consume electrical energy;
   control circuitry configured to control individual ones of the input adapters to provide electrical energy from respective ones of the source entities to the bus system and to control individual ones of the output adapters to provide electrical energy from the bus system to respective ones of the consuming entities; and
   wherein one of the output adapters is configured to couple with a grid system, and the control circuitry is configured to determine a first amount of electrical energy to be provided to the consuming entities which are coupled with the output adapters, and to control provision of a second amount of electrical energy to the grid system when a third amount of electrical energy is received from the source entities which is greater than the first amount.

2. The system of claim 1 wherein another of the output adapters is configured to provide electrical energy to one of the consuming entities which is a primary load, at least one of the source entities provides variable amounts of electrical energy at different moments in time, and wherein the another of the output adapters provides the electrical energy to meet demands of the primary load during the different moments in time.

3. The system of claim 2 further comprising a storage system configured to store electrical energy, and wherein the electrical energy of the storage system is provided to the another of the output adapters at one of the different moments in time.

4. The system of claim 2 wherein electrical energy from a plurality of the input adapters is provided to the another of the output adapters at the different moments in time.

5. The system of claim 1 wherein one of the input adapters is configured to couple with the grid system and the control circuitry is configured to control provision of electrical energy which was received from the grid system to another of the output adapters as a result of a request to consume electrical energy from the grid system.

6. The system of claim 1 wherein the control circuitry is configured to select one of the input adapters to supply electrical energy from a respective one of the source entities to the bus system and to select another of the output adapters to provide electrical energy from the bus system to a respective one of the consuming entities according to a plurality of rules.

7. The system of claim 6 wherein the rules prioritize the source entities according to an order which specifies that the one of the input adapters is selected to supply electrical energy from the respective one of the source entities before another of the input adapters is selected to supply electrical energy from another of the source entities.

8. The system of claim 7 wherein another of the output adapters is configured to provide electrical energy to one of the consuming entities which is a primary load, and the control circuitry is configured to assign the another of the output adapters as the highest priority to receive electrical energy from the bus system before others of the output adapters including the one output adapter.

9. The system of claim 1 wherein the input adapters are configured to convert electrical energy supplied from the source entities into a format of electrical energy upon the bus system and the output adapters are configured to convert the electrical energy upon the bus system into different formats corresponding to respective ones of the consuming entities.

10. The system of claim 1 wherein the bus system comprises a meshed switch configured to selectively provide electrical energy from any of the input adapters to any of the output adapters.

11. The system of claim 1 wherein the bus system comprises a meshed switch configured to isolate a first power connection from a first of the input adapters to a first of the output adapters from a second power connection from a second of the input adapters to a second of the output adapters.

12. The system of claim 1 wherein at least one of the input adapters is bi-directional and may provide electrical energy from the bus system to one of the source entities coupled with the at least one of the input adapters, and wherein the control circuitry is configured to determine an amount of electrical energy to be provided by the at least one of the input adapters to the one of the source entities.

13. An energy system comprising:
    storage system configured to store electrical energy;
    a plurality of input adapters configured to electrically couple with a plurality of respective source entities which are individually configured to provide electrical energy;
    a plurality of output adapters configured to electrically couple with a plurality of respective consuming entities which are individually configured to consume electrical energy; and
    a bus system electrically-coupled with the storage system and configured to supply electrical energy from different ones of the input adapters to the storage system to charge the storage system at a plurality of moments in time and to discharge electrical energy from the storage system to different ones of the output adapters at a plurality of moments in time; and
    control circuitry configured to determine a first amount of electrical energy provided to the consuming entities which are coupled with the output adapters, to control provision of a second amount of electrical energy to the storage system when a third amount of electrical energy is received from the source entities which is greater than the first amount, and to control selective discharge of electrical energy from the storage system to the bus system.

14. The system of claim 13 wherein one of the input adapters is configured to electrically couple with one of the source entities which is a grid system, and further comprising control circuitry configured to access price information regarding electrical energy from the grid system, and wherein the control circuitry is configured to use the price information to control storage of electrical energy from the grid system at a first moment in time and to use the price information to control discharging of electrical energy from the storage system to the grid system at a second moment in time.

15. The system of claim 13 further comprising an energy conversion system comprising a plurality of induction generators which are mechanically coupled with one another via a shaft, and wherein the energy conversion system is electrically coupled with one of the input and output adapters and configured to one of provide electrical energy to the one of the input and output adapters or receive electrical energy from the one of the input and output adapters.

16. The system of claim 13 wherein the storage system comprises a plurality of energy storage devices, and the bus system is configured to simultaneously provide charging electrical energy to at least one of the energy storage devices and to discharge electrical energy from another of the energy storage devices.

17. The system of claim 1 wherein the control circuitry is configured to monitor an amount of the electrical energy which is provided to the bus system and to disable another of the output adapters as a result of the monitoring.

\* \* \* \* \*

UNITED STATES PATENT AND TRADEMARK OFFICE
CERTIFICATE OF CORRECTION

PATENT NO. : 9,525,285 B2
APPLICATION NO. : 13/495935
DATED : December 20, 2016
INVENTOR(S) : Shane Johnson, Allan Coxon and Ian Walker It is certified that error appears in the above-identified patent and that said Letters Patent is hereby corrected as shown below:

Column 4, Line 11 - Replace "adapters may" with --adapters 106 may--

Column 4, Line 12 - Replace "Adapters may" with --Adapters 106 may--

Column 5, Line 2 - Replace "adapters may" with --adapters 106 may--

Column 12, Line 15 - Replace "bus system in" with --bus system 104 in--

Column 16, Line 45 - Replace "storage circuitry and" with --storage circuitry 406 and--

Column 20, Line 56 - Replace "systems 112 in" with --systems in--

Column 20, Line 59 - Replace "systems 112 and" with --systems and--

Column 20, Line 60 - Replace "systems 112 according" with --systems according--

Signed and Sealed this
Fifth Day of June, 2018

Andrei Iancu
*Director of the United States Patent and Trademark Office*